US012054695B1

(12) United States Patent
Gowder

(10) Patent No.: US 12,054,695 B1
(45) Date of Patent: Aug. 6, 2024

(54) CLEANING SOLUTION FOR PRODUCE

(71) Applicant: KING FAISAL UNIVERSITY, Al-Ahsa (SA)

(72) Inventor: Sivakumar Joghi Thatha Gowder, Hofuf (SA)

(73) Assignee: KING FAISAL UNIIVERSITY, Al-Ahsa (SA)

( * ) Notice: Subject to any disclaimer, the term of this patent is extended or adjusted under 35 U.S.C. 154(b) by 0 days.

(21) Appl. No.: 18/439,635

(22) Filed: Feb. 12, 2024

(51) Int. Cl.

| | |
|---|---|
| ***C11D 7/10*** | (2006.01) |
| ***A23L 3/34*** | (2006.01) |
| ***B08B 3/04*** | (2006.01) |
| ***C11D 7/44*** | (2006.01) |
| ***C11D 17/00*** | (2006.01) |

(52) U.S. Cl.
CPC .................. *C11D 7/10* (2013.01); *C11D 7/44* (2013.01); *C11D 17/0008* (2013.01); *C11D 2111/40* (2024.01)

(58) Field of Classification Search
CPC .. C11D 3/046; C11D 7/10; C11D 7/44; B08B 3/04; A23L 3/34
See application file for complete search history.

(56) References Cited

U.S. PATENT DOCUMENTS

| | | | | |
|---|---|---|---|---|
| 2017/0143618 A1* | 5/2017 | McPherson | ............. | A61P 43/00 |
| 2022/0218007 A1* | 7/2022 | Kantharuban | .......... | A23L 27/40 |

FOREIGN PATENT DOCUMENTS

| | | | | |
|---|---|---|---|---|
| CN | 106010827 A | 10/2016 | | |
| CN | 107245382 A | 10/2017 | | |
| IN | 202311040408 A | 7/2023 | | |
| WO | 2015001442 A1 | 1/2015 | | |
| WO | WO 2015/001442 * | 1/2015 | ............. | A23L 1/015 |

OTHER PUBLICATIONS

Giang et al., "Effects of Washing Procedures in Reducing Listeria Monocytogenes on Raw Leafy Vegetables", Czech Journal of Food Sciences, 40, 2022 (6), 422-426, https://doi.org/10.17221/98/2022-CJFS.

* cited by examiner

*Primary Examiner* — Brian P Mruk
(74) *Attorney, Agent, or Firm* — Nath, Goldberg & Meyer; Joshua B. Goldberg

(57) ABSTRACT

A cleaning solution for produce includes Himalayan pink crystal salt, turmeric powder, and water. In an embodiment, the turmeric powder is Alleppey finger turmeric powder. The cleaning solution can include equal concentrations of Himalayan crystal salt and Alleppey finger turmeric powder. The cleaning solution for produce can be particularly effective for detoxifying fruits and vegetables of pesticide residues and bacterial contamination.

7 Claims, No Drawings

CLEANING SOLUTION FOR PRODUCE

BACKGROUND

1. Field

The present subject matter relates to a cleaning solution, and particularly to a cleaning solution for fruits and vegetables.

2. Description of the Related Art

When consuming fruits and vegetables, contamination by pesticides and chemical residues is a common hazard that has been identified world over because of excessive use or misuse prior to crop harvesting. Although the trend is to move away from high pesticide use through organic farming, in the short term it is difficult to avoid the use of pesticides in fruit and vegetable cultivation. The difficulty is in removing these residues by normal washing.

Washing is an essential preliminary step in both domestic and commercial food preparation. While loosely held particulate contamination may be easily removed by washing with water, adherent or thinly coated pesticide residues may be more resistant to removal by washing. Further, water is not effective in removing pesticide residues that are not water soluble.

Thus, a cleaning solution for produce solving the aforementioned problems is desired.

SUMMARY

The present subject matter relates to a cleaning solution for produce. According to an embodiment, the cleaning solution can include Himalayan crystal salt, turmeric powder, and water. In an embodiment, the turmeric powder can be Alleppey finger turmeric powder. In an embodiment, the cleaning solution can include equal concentrations of Himalayan crystal salt and Alleppey finger turmeric powder. The cleaning solution for produce can be particularly effective for detoxifying fruits and vegetables of pesticide residues and bacterial contamination.

An embodiment of the present teachings relates to a method of detoxifying produce in which the produce is immersed in a cleaning solution including Himalayan crystal salt and turmeric powder. In an embodiment, the produce remains immersed in the solution for a period of time ranging from about 5 minutes to about 3 hours.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms “a”, “an”, and “the” include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms “include,” “includes”, “including,” “have,” “has,” or “having” should be generally understood as open-ended and non-limiting unless specifically stated otherwise.

The use of the singular herein includes the plural (and vice versa) unless specifically stated otherwise. In addition, where the use of the term “about” is before a quantitative value, the present teachings also include the specific quantitative value itself, unless specifically stated otherwise. As used herein, the term “about” refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use “comprising” language. However, it will be understood by one of skill in the art, that in some specific instances, an embodiment can alternatively be described using the language “consisting essentially of” or “consisting of”.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term “about”. Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

An embodiment of the present subject matter relates to a cleaning solution for produce. The produce can be selected from at least one of fruits and vegetables. According to an embodiment, the cleaning solution can include Himalayan pink crystal salt, turmeric powder, and water. In an embodiment, the turmeric powder can be Alleppey finger turmeric powder. In an embodiment, the cleaning solution can include equal concentrations of Himalayan crystal salt and Alleppey finger turmeric powder. The cleaning solution for produce can be particularly effective for detoxifying fruits and vegetables of pesticide residues and bacterial contamination.

An embodiment of the cleaning solution for produce consists essentially of water and equal concentrations of Himalayan pink crystal salt and Alleppey finger turmeric powder.

The cleaning solution for produce is an all-natural, non-toxic solution. Himalayan pink crystal salt is found in nature and includes calcium, potassium, magnesium, and iron. The pink color of the salt is due to the presence of iron oxide in the salt. It is believed that the mineral components of the salt contribute to the cleaning process. Alleppey finger turmeric powder is also a natural product that is rich in minerals such as potassium and iron. Both Himalayan pink crystal salt and Alleppey finger turmeric powder originate from southern India and possess antimicrobial or anti-cancerous properties. The combination of Himalayan pink crystal salt and Alleppey finger turmeric powder effectively removes microbes and pesticides from fruits and vegetables.

An embodiment of the present teachings relates to a method of detoxifying produce in which the produce is immersed in a cleaning solution including water, Himalayan crystal salt, and turmeric powder. In an embodiment, the produce remains immersed in the solution for a period of time ranging from about 5 minutes to about 3 hours. The method provides a highly effective method to remove undesirable contamination from the surface of fruits and vegetables. In particular, the method is effective for removing microbes and pesticides from fruits and vegetables.

EXAMPLES

Example 1

4 grams of ingredients (2 grams of Himalayan Crystal Salt and 2 grams of Allepey Finger Turmeric powder) are mixed in one liter of water.

Samples from vegetables (carrots, potatoes, etc.) were purchased from the market and were washed with the present solution. We cut the samples into small pieces and then homogenized them by using a mortar and pestle. Normal saline solution was used to dilute the homogenized sample. A small drop of the sample solution was taken and placed in a microscopic slide. As observed under a light microscope, the sample showed negative results for microbes. Gram and acid fast staining methods were also used, but still no microbes were found in the samples.

It is to be understood that the cleaning solution for produce is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of cleaning produce, comprising:
immersing the produce in a cleaning solution for produce, the cleaning solution consisting essentially of:
equal concentrations of Himalayan pink crystal salt and Alleppey finger turmeric powder; and
water.

2. The method of claim 1, wherein the produce is selected from at least one of fruits and vegetables.

3. The method of claim 1, wherein the produce is immersed in the cleaning solution for a period of time ranging from about 5 minutes to about 3 hours.

4. A method of detoxifying produce, comprising:
providing a cleaning solution comprising equal concentrations of Himalayan crystal salt and turmeric powder in water; and
immersing the produce in the cleaning solution.

5. The method of claim 4, wherein the produce remains immersed in the solution for a period of time ranging from about 5 minutes to about 3 hours.

6. The method of claim 4, wherein the produce is selected from at least one of fruits and vegetables.

7. The method of claim 4, wherein the turmeric powder is Alleppey finger turmeric powder.

* * * * *